United States Patent
Thorn et al.

(10) Patent No.: US 9,716,876 B2
(45) Date of Patent: Jul. 25, 2017

(54) POWER EFFICIENT MULTIPLE CAMERA SYSTEM

(71) Applicant: Sony Mobile Communications Inc., Tokyo (JP)

(72) Inventors: Ola Thorn, Limhamn (SE); Jonas Gustavsson, Lomma (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 204 days.

(21) Appl. No.: 14/675,811

(22) Filed: Apr. 1, 2015

(65) Prior Publication Data

US 2016/0295195 A1    Oct. 6, 2016

(51) Int. Cl.
*H04N 5/33*       (2006.01)
*H04N 13/02*      (2006.01)
*H04N 5/232*      (2006.01)

(52) U.S. Cl.
CPC ..... *H04N 13/0239* (2013.01); *H04N 5/23219* (2013.01); *H04N 5/23222* (2013.01); *H04N 5/23241* (2013.01); *H04N 5/23245* (2013.01); *H04N 5/33* (2013.01); *H04N 13/0296* (2013.01)

(58) Field of Classification Search
None
See application file for complete search history.

(56) References Cited

U.S. PATENT DOCUMENTS

| | | | | |
|---|---|---|---|---|
| 9,167,231 | B2* | 10/2015 | Kawakami | H04N 13/0022 |
| 2004/0212677 | A1* | 10/2004 | Uebbing | H04N 7/181 |
| | | | | 348/155 |
| 2012/0314038 | A1* | 12/2012 | Murayama | G03B 35/08 |
| | | | | 348/49 |
| 2013/0101263 | A1* | 4/2013 | Morioka | G03B 35/08 |
| | | | | 386/224 |
| 2015/0341620 | A1* | 11/2015 | Han | B60R 1/00 |
| | | | | 701/37 |
| 2015/0362989 | A1* | 12/2015 | Tyagi | G06F 3/011 |
| | | | | 345/156 |
| 2016/0212411 | A1* | 7/2016 | Lindner | H04N 13/0271 |
| 2016/0275694 | A1* | 9/2016 | Nomura | G06T 7/0024 |
| 2016/0330427 | A1* | 11/2016 | Nam | H04N 13/0007 |
| 2016/0353083 | A1* | 12/2016 | Aoki | H04N 13/0246 |

OTHER PUBLICATIONS

International Search Report and Written Opinion from counterpart International Patent Application No. PCT/US2015/053276, mailed Jan. 13, 2016.

* cited by examiner

*Primary Examiner* — Reza Aghevli
(74) *Attorney, Agent, or Firm* — Tucker Ellis LLP (57) ABSTRACT

A device may include a digital camera that includes a stereo camera pair of a first camera and a second camera, and a system control that is capable of turning the first camera and the second camera on and off separately. Additionally, the device may include a processor to receive a first image via the first camera, and detect a scene type associated with the first image. The device may also determine whether the scene type is amenable to stereo capture and perform parallax difference detection to detect whether the first image is capable of being resolved correctly. The device may perform stereo image capture of the first image and the second image via the stereo camera pair in response to a determination that the first image is capable of being resolved correctly.

18 Claims, 6 Drawing Sheets

POWER EFFICIENT MULTIPLE CAMERA SYSTEM

BACKGROUND

Various user devices, such as mobile or portable devices, include digital cameras to allow users to capture images and video. The power consumption of these user devices camera depend on the power consumption of the digital cameras as well as the power consumption associated with various sensors that are increasingly added to these user devices. Each digital camera may include a lens assembly, an image capture sensor, a MIPI (Mobile Industry Processor Interface) camera serial interface and an image signal processor (ISP). The MIPI Alliance is a non-profit corporation that operates as an open membership organization for all companies in the mobile device industry and produces standards for mobile devices, such as digital cameras.

In some instances, the digital cameras may include multiple cameras. For example, the digital camera may include a stereo camera or a micro-lens array. The stereo camera can include a pair of cameras that may be used to capture three dimensional (3D) images. The pairs of cameras may have different functions and capabilities. For example, the pairs of cameras may include high resolution cameras or low resolution cameras.

SUMMARY

In one implementation, a mobile device may include a digital camera that includes a stereo camera pair of a first camera and a second camera and a system control that is capable of turning the first camera and the second camera on and off separately. The mobile device may include a processor that may receive a first image via the first camera and detect a scene type associated with the first image. The processor may determine whether the scene type is amenable to stereo capture, and, in response to a determination that the scene type is amenable to stereo capture, perform parallax difference detection to detect whether the first image is capable of being resolved correctly. The processor may perform stereo image capture of the first image and the second image via the stereo camera pair in response to a determination that the first image is capable of being resolved correctly.

According to another implementation, a computer-implemented method may include receiving a first image via a first camera of a digital camera system that includes a stereo camera pair of the first camera and a second camera, and a system control that is capable of turning the first camera and the second camera on and off separately. The method may include detecting a scene type associated with the first image, and determining whether the scene type is amenable to stereo capture. In response to a determination that the scene type is amenable to stereo capture, the method may include performing parallax difference detection to detect whether the first image is capable of being resolved correctly. The method may further include performing stereo image capture of the first image and the second image via the stereo camera pair in response to a determination that the first image is capable of being resolved correctly In another implementation, a non-transitory computer-readable medium including computer-executable instructions, the computer-executable instructions may include instructions to receive a first image via a first camera of a digital camera system that includes a stereo camera pair of the first camera and a second camera, and a system control that is capable of turning the first camera and the second camera on and off separately. The instructions may detect a scene type associated with the first image. The instructions may determine whether the scene type is amenable to stereo capture. In response to a determination that the scene type is amenable to stereo capture, the instructions may perform parallax difference detection to detect whether the first image is capable of being resolved correctly. In response to a determination that the first image is capable of being resolved correctly, the instructions may perform stereo image capture of the first image and the second image via the stereo camera pair.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

In the following, a mobile device may include a digital camera system that includes multiple cameras, such as a stereo camera. The stereo camera may include two of the same types of camera (e.g., two high resolution cameras or two low resolution cameras). Alternatively, the stereo camera may include a main camera and a supporting camera. The main camera may be a high resolution camera and the supporting camera may be a low resolution camera. The mobile device may include a system control that is able to turn on and turn off each camera separately. The mobile device may include an image signal processor (ISP) that may receive camera images via a MIPI interface and may activate processing for the stereo camera based on subject matter to save as power as possible. The ISP may detect what type of scene is in the images and then turn on and turn off one or more of multiple cameras based on the scene type. In instances when one or more of multiple cameras is turned off, the ISP may process images using the remaining camera.

Figure 1:
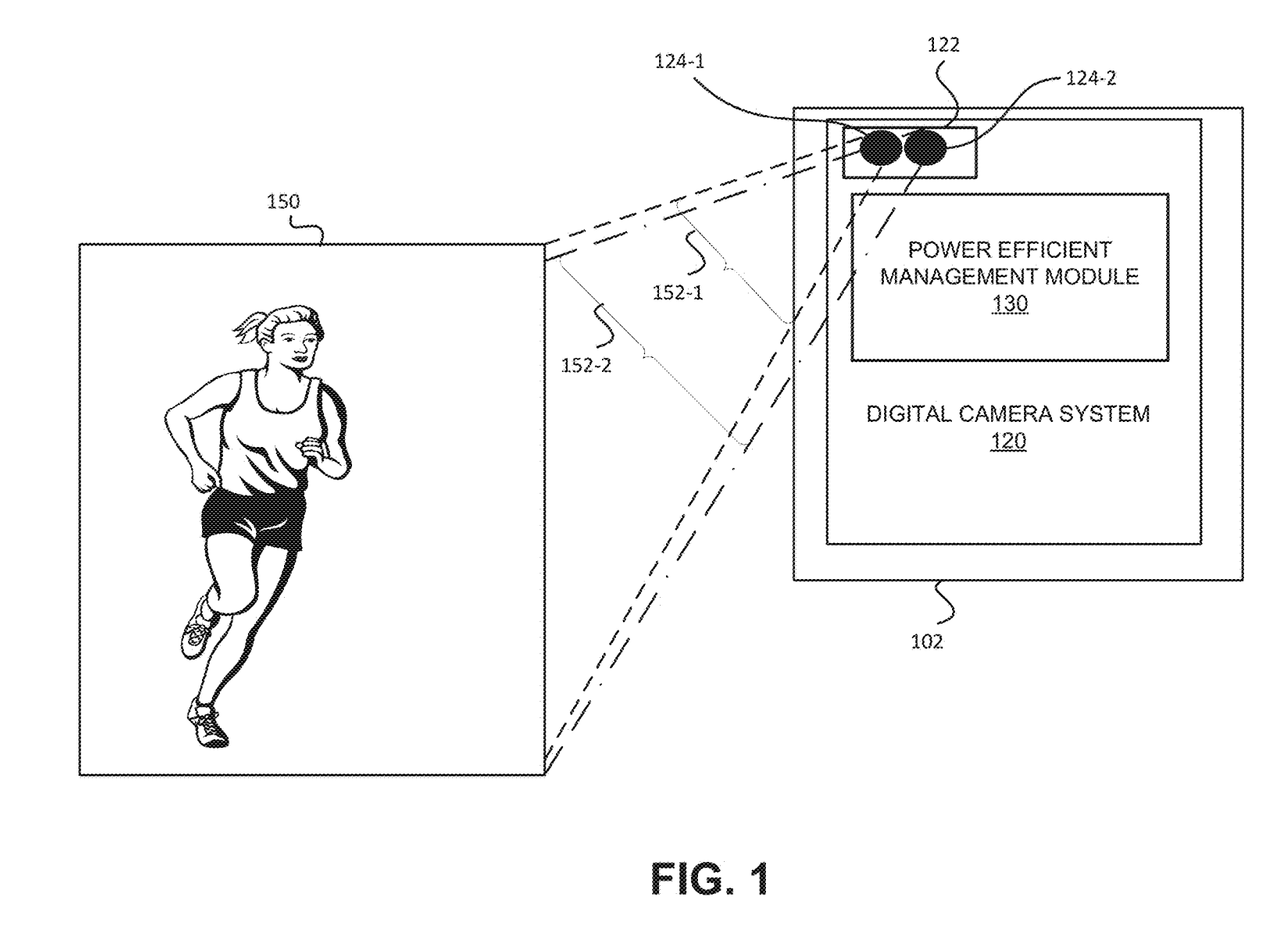
FIG. 1 illustrates the concepts described herein.

FIG. 1 illustrates an exemplary environment 100 in which systems and/or methods described herein may be implemented. As illustrated, environment 100 may include a mobile device 102 that includes a digital camera system 120. Digital camera 110 may include a stereo camera 122 and a power efficient management module 130. Stereo camera 122 may be used to capture images 152 from a scene 150. Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

As shown in FIG. 1, digital camera system 120 may include stereo camera 122, which may include multiple (e.g., stereo pair) cameras 124, such as a first camera 124-1 and a second camera 124-2 that each independently consume power while used to capture respective images 152-1 and 152-2 that are used, for example, to form three dimensional (3D) images. The first camera 124-1 may include a low resolution camera 124-1 that consumes lower power when compared to the second camera 124-2 which may include a high resolution camera 124-2. Alternatively, both cameras 124 may consume a same amount of power and/or have a same resolution. Digital camera system 120 may include a power efficient management module 130 that manages power saving for the multiple cameras 124 in mobile device 102.

More particularly, power efficient management module 130 may monitor and control utilization of stereo pair cameras 124 (by digital camera system 120 to capture images used in 3D imaging) to detect instances in which value of usage of the stereo pair cameras 124 falls beneath a minimum threshold, such as described herein below with respect to FIGS. 3 to 8. For instance, power efficient management module 130 may detect that the subject 150 is at too far a distance from the mobile device 102 for effective ocular or parallax difference between the captured images 152 to form a 3D image that provides additional information. In other words, the distance from the subject may render the two images substantially identical, thus obviating the benefit of a 3D image generated based on the images. Further, power efficient management module 130 may detect that there is too much cross talk between the images 152. In these instances, digital camera system 120 may disable the stereo capture by the stereo pair cameras 124 and thus cut power consumption in half.

In instances in which the multiple cameras 124 include a low resolution camera 124-1 and a high resolution camera 124-2, power efficient management module 130 may use scene detection (in the ISP of mobile device 102, not shown in FIG. 1) for the low resolution camera 124-1 to remove various scenes or layouts that do not work for general stereo capture. In these instances general parallax convergence 3D construction does not provide significant additional information when compared to a mono or single image 152-1. Power efficient management module 130 may thereby limit the power overhead on power consumption areas associated with stereo image capture 152 for these scenes or layouts.

Power efficient management module 130 may direct ISP processing of images received from low resolution camera 124-1. In instances in which scenes or layouts that do not require stereo images have been removed (or excluded) from processing for 3D images, power efficient management module 130 may perform centered image segment parallax difference detection on the remaining images to check for surfaces or subject matter that will not resolve correctly. Power efficient management module 130 may thereby remove the false positives (i.e., images 152 in which stereo capture carries no additional value) and further reduce the power overhead of the stereo implementation. When instances in which stereo images provide insufficient additional information have been eliminated, power efficient management module 130 may enable the full 3D parallax scene reconstruction to reconstruct images from the stereo pair cameras 124 accordingly, thus limiting the power overhead of the camera implementation.

In implementations described herein, a system and method of determining power conservation or reduced power consumption for a stereo camera considering of one main camera and a supporting camera is disclosed. The system may control the activation of each camera separately and may determine instances in which both cameras are to be used based on parallax difference associated with the images to be captured.

Figure 2:
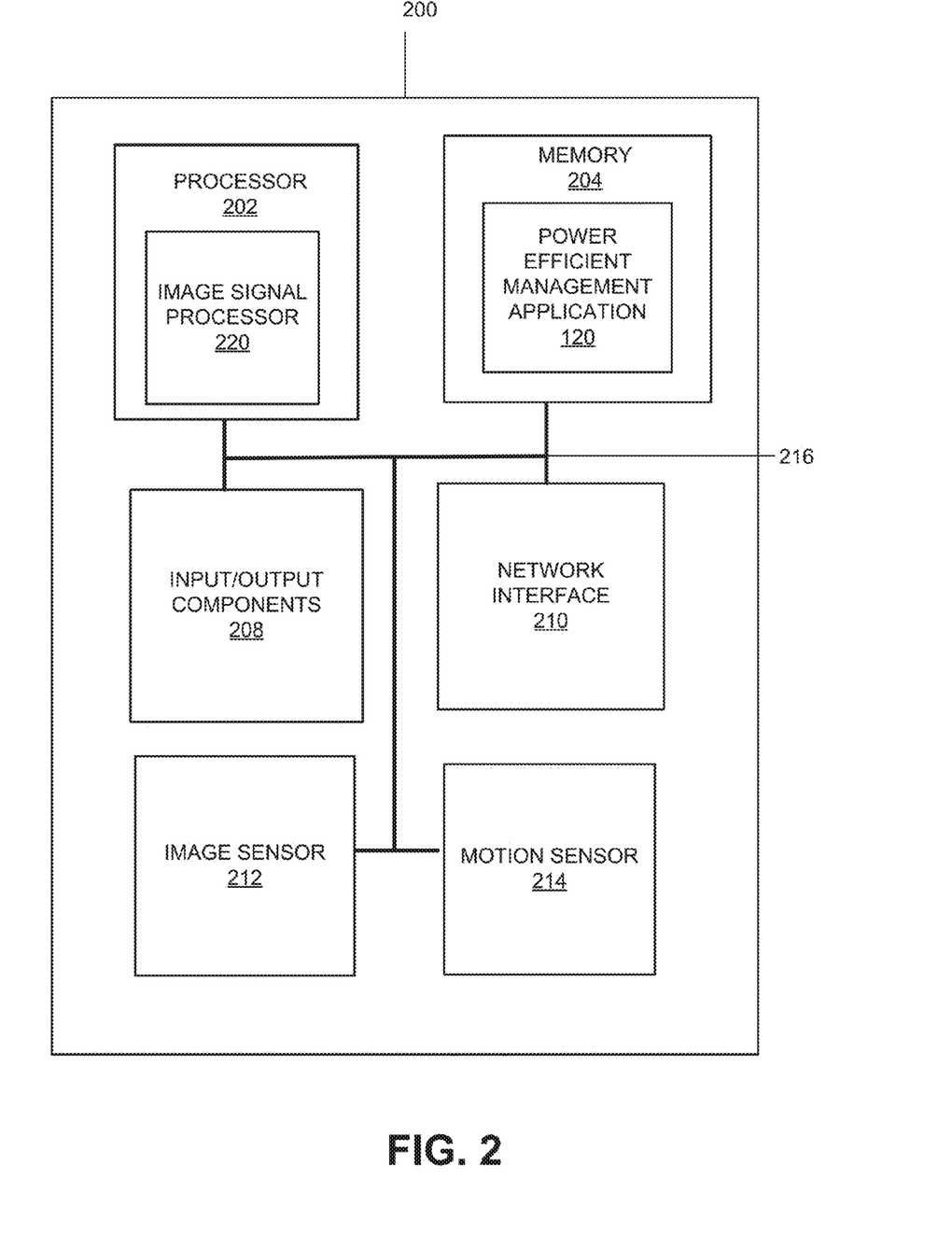
FIG. 2 is a block diagram of exemplary components of a device that may correspond to the mobile device of FIG. 1.

FIG. 2 is a diagram of exemplary components of a device 200 that may correspond to mobile device 102. As shown in FIG. 2, device 200 may include a processor 202, a memory 204, input/output components 208, a network interface 210, a camera image sensor 212, a motion sensor 214, and a communication path 216. In different implementations, device 200 may include additional, fewer, or different components than the ones illustrated in FIG. 2. For example, device 200 may include additional network interfaces, such as interfaces for receiving and sending data packets.

Processor 202 may include a processor, a microprocessor, an Application Specific Integrated Circuit (ASIC), a Field Programmable Gate Array (FPGA), and/or other processing logic (e.g., audio/video processor) capable of processing information and/or controlling device 200.

Processor 202 may include an image signal processor (ISP) 220. ISP 220 may receive image data that is captured by a lens assembly and image capturing element associated with (or incorporated into) mobile device 102. ISP 220 may receive input raw image data and output an image after processing the raw image data, such as a stereo image, standard image, etc. ISP 220 may detect modes (i.e., perform scene detection) associated with the incoming raw image data. For example, ISP 220 may determine whether an image is to be output as a document, a night time or low light shot, landscape or portrait, etc.

Memory 204 may include static memory, such as read only memory (ROM), and/or dynamic memory, such as random access memory (RAM), or onboard cache, for storing data and machine-readable instructions. Memory 204 may also include storage devices, such as a floppy disk, CD ROM, CD read/write (R/W) disc, and/or flash memory, as well as other types of storage devices.

Memory 204 may include power efficient management module 130. Power efficient management module 130 may be implemented in conjunction with ISP 220 to control the efficiency of power consumption by the cameras in mobile device 102 by maintaining a minimum threshold for usage of both stereo pair cameras 124 based on parallax difference between images at each of the stereo pair cameras 124. Power efficient management module 130 may include machine-readable instructions to determine a current mode of the digital camera system 120 provides sufficient information to require stereo image capture by stereo pair cameras 124. Power efficient management module 130 may also include machine-readable instructions to whether the distance from stereo pair cameras 124 is large enough to capture 3D information.

Input/output components 208 may include a display screen (e.g., touchscreen display 104, touchscreen display 204, etc.), a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 200.

Network interface 210 may include any transceiver-like mechanism that enables device 200 to communicate with other devices and/or systems. For example, network interface 210 may include mechanisms for communicating via a network, such as the Internet, a terrestrial wireless network (e.g., a WLAN), a cellular network, a satellite-based network, a WPAN, etc. Additionally or alternatively, network interface 210 may include a modem, an Ethernet interface to a LAN, and/or an interface/connection for connecting device 200 to other devices (e.g., a Bluetooth interface).

Camera image sensor 212 may detect and convey information that constitutes an image. Camera image sensor 212 may convert the variable attenuation of waves (as they pass through or reflect off objects) into signals and convey this information via a camera interface small bursts of current to ISP 220. The waves may be light or other electromagnetic radiation. Each of multiple cameras (or stereo pair cameras) 124 may have an associated camera image sensor 212. Camera image sensor 212 may high resolution and low resolution sensors.

Motion sensor 214 may include, or be an accelerometer, a magnetometer, a barometer a gyroscope, etc. Motion sensor 214 may provide information regarding motion of device 200. Motion sensor 214 may continuously calculate the position, orientation, and velocity of device 200 without reliance on an external reference. In one implementation, motion sensor 214 may determine a position, orientation, and velocity of device 200 using combinations of different sensors, such as accelerometers, magnetometers, barometers and gyroscopes. Motion sensor 214 may provide information that may be used to determine whether motion of device 200 may have resulted in a change in the image detected by digital camera system 120.

Communication path 216 may provide an interface (e.g., a bus) through which components of device 200 may communicate with one another.

Figure 3:
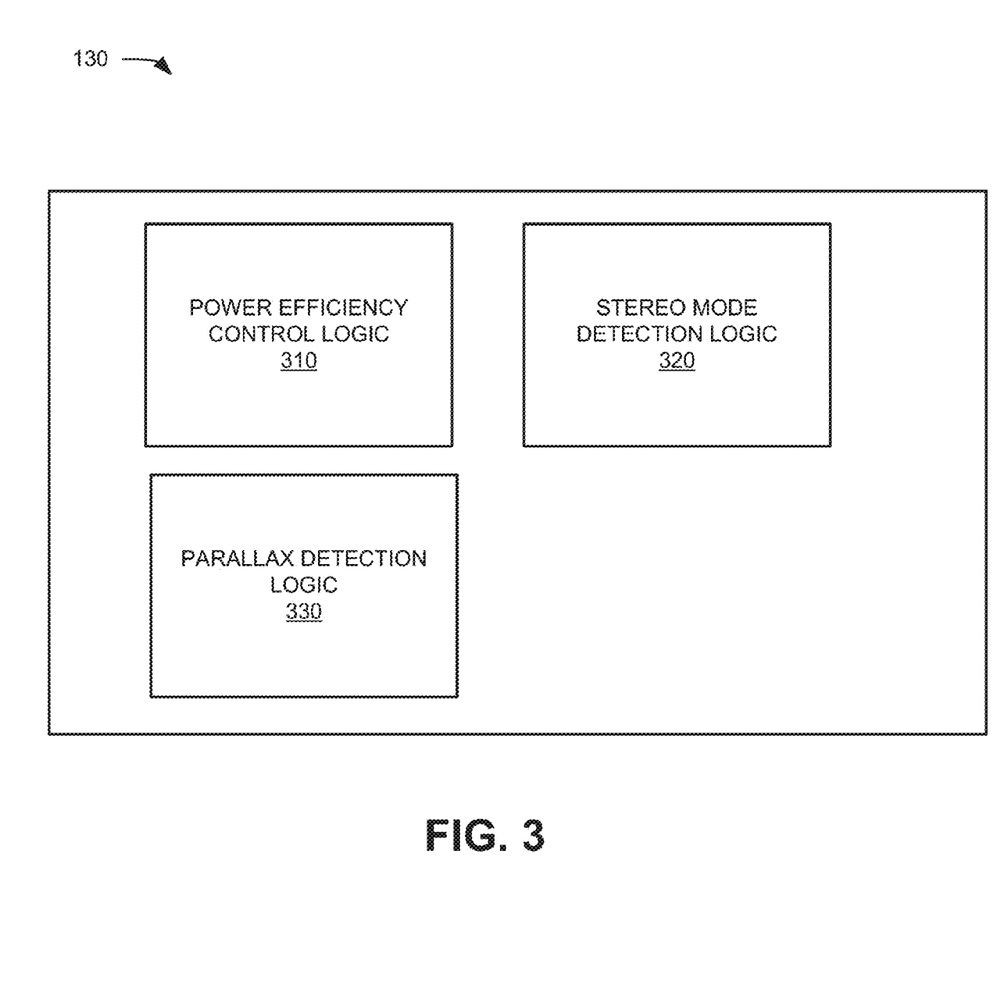
FIG. 3 is a diagram of exemplary functional components of the power efficient management module of FIG. 1.

FIG. 3 is an exemplary functional block diagram of power efficient management module 130. As shown in FIG. 3, power efficient management module 130 may include power efficiency control logic 310, stereo mode detection logic 320, parallax detection logic 330 and adjustment detection logic 340. The configuration of components of power efficient management module 130 illustrated in FIG. 3 is for illustrative purposes only. Other configurations may be implemented. Therefore, power efficient management module 130 may include additional, fewer and/or different components than those depicted in FIG. 3.

Power efficiency control logic 310 may control power consumption associated with stereo pair cameras 124 (and consequently digital camera system 120) based on input received from stereo mode detection logic 320, parallax detection logic 330 and adjustment detection logic 340. Power efficiency control logic 310 may start low resolution camera 124-1 in instances in which a scene is detected by the digital camera system 120. The detected low resolution image 152-1 may be transmitted to stereo mode detection logic 320.

In one embodiment, power efficiency control logic 310 may turn on a main camera (e.g., camera 124-1) and then start the other camera (e.g., camera 124-2) if stereo mode detection logic 320 detects that a particular scene is amendable to stereo capture (e.g., the particular scene includes information that may be used for general parallax convergence 3D reconstruction). In another embodiment, power efficiency control logic 310 may turn on the main camera (e.g., camera 124-1) and only momentarily start the second camera (e.g., camera 124-2) to generate images from stereo mode detection logic 320 and/or parallax detection logic 330 may determine parallax.

Stereo mode detection logic 320 may use scene detection for the low resolution camera 124-1 (i.e., detected low resolution image 152-1) to remove various scenes or layouts that do not require stereo capture to thereby limit power overhead on the main problem areas. Particular modes may be automatically indicated as not requiring stereo capture. For example, stereo mode detection logic 320 may indicate that documents are to be captured using a single camera 124-1 without stereo capture (e.g., low resolution camera 124-1 or high resolution camera 124-2). In another example, stereo mode detection logic 320 may indicate that a landscape photograph is to be captured using a single camera 124-1 in an instance in which there are no foreground objects and two stereo pair cameras 124 would provide substantially the same information.

Parallax detection logic 330 may apply centered image segment parallax difference detection to check for surfaces or subject matter that will not resolve correctly in a generated 3D image. Parallax detection logic 330 may remove the false positives, thereby further reducing the power overhead of stereo implementation. Parallax detection logic 330 may check parallax distance between stereo pair camera 124-1 and stereo pair camera 124-1 and if the parallax difference is not great enough (i.e., no depth information), parallax detection logic 330 may turn off one of the stereo pair cameras 124 as the additional image data does not provide additional information that is useful in stereo capture.

According to an embodiment, stereo mode detection logic 320 and parallax detection logic 330 may be implemented in conjunction to analyze the detected image 152-1 to determine whether stereo capture (e.g., general parallax convergence 3D reconstruction) is required for the low resolution image 152-1. For example, stereo mode detection logic 320 may detect that the digital camera system 120 is to capture a two dimensional (2D) document. Stereo mode detection logic 320 may detect whether the document is flat using IR spectrum reflectivity or parallax differences. In instances in which the document is determined to be flat, stereo mode detection logic 320 may indicate that the document is to be captured using a single camera 124.

In another example, stereo mode detection logic 320 may capture an image of a screen that is two dimensional (2D) (i.e., a flat picture or image). The screen is two dimensional (2D) and is not amendable to stereo capture (e.g., parallax convergence 3D reconstruction). In this instance parallax detection logic 330 may detect whether the image requires 3D construction using infrared (IR) spectrum reflectivity or parallax differences.

In another example, stereo mode detection logic 320 may capture a face that includes 3D information. Stereo mode detection logic 320 may detect that the picture requires stereo capture using face detection.

In another example, stereo mode detection logic 320 may detect that a landscape with no foreground objects is to be captured using scene recognition. Parallax detection logic 330 may indicate that this image does not require stereo capture (or 3D reconstruction).

In yet another example, stereo mode detection logic 320 may detect that a landscape with foreground objects is to be captured based on the ocular distance. In this instance parallax detection logic 330 may indicate that this image requires stereo capture based on parallax between images 124-1 and 124-2 exceeding a predetermined threshold for parallax between the images 124.

In a further example, parallax detection logic 330 may detect that the image is a group picture (based on stereo scene (or stereo scene flow) detection). In another example, stereo mode detection logic 320 may detect that a picture is being captured through a glass using IR spectrum reflectivity or parallax differences. If the parallax difference indicates that the picture is being captured through glass, stereo mode detection logic 320 may indicate that the picture is to be captured using both stereo pair cameras 124 (e.g., image 152-1 and 152-2 as shown in FIG. 1, described herein above).

Power efficiency control logic 310 may receive information from stereo mode detection logic 320 and/or parallax detection logic 330 regarding whether the parallax associated with the detected image 152 is above a threshold for parallax difference and thereby requires capture by both stereo pair cameras 124. Accordingly, power efficiency control logic 310 may enable full 3D parallax scene reconstruction in instances in which the parallax is sufficient to reconstruct an image. In instances in which the parallax difference is not sufficient, power efficiency control logic 310 may direct the ISP 220 to construct the image from a single stereo pair camera 124, thereby limiting the power overhead of stereo camera implementation.

Adjustment detection logic 340 may be implemented to determine whether any changes with respect to the picture or scene require recalculation of the parallax associated with the images 152 (i.e., image 152-1 and image 152-2). Adjustment detection logic 340 may determine whether there is any movement in the image that changes scene type, such as a person moving, an object entering the scene, etc. In one embodiment, adjustment detection logic 340 may determine whether parts of the camera are moving with respect to the mobile device 102 (e.g., the camera housing is rotating/moving) or the mobile device 102 itself is moving (detected using gyroscope/accelerometer). Adjustment detection logic 340 may determine whether the scene type may have changed based on (a change in) the distance to the object and provide this information to power efficiency control logic 310 to recalibrate the parallax between images 152.

Figure 4:
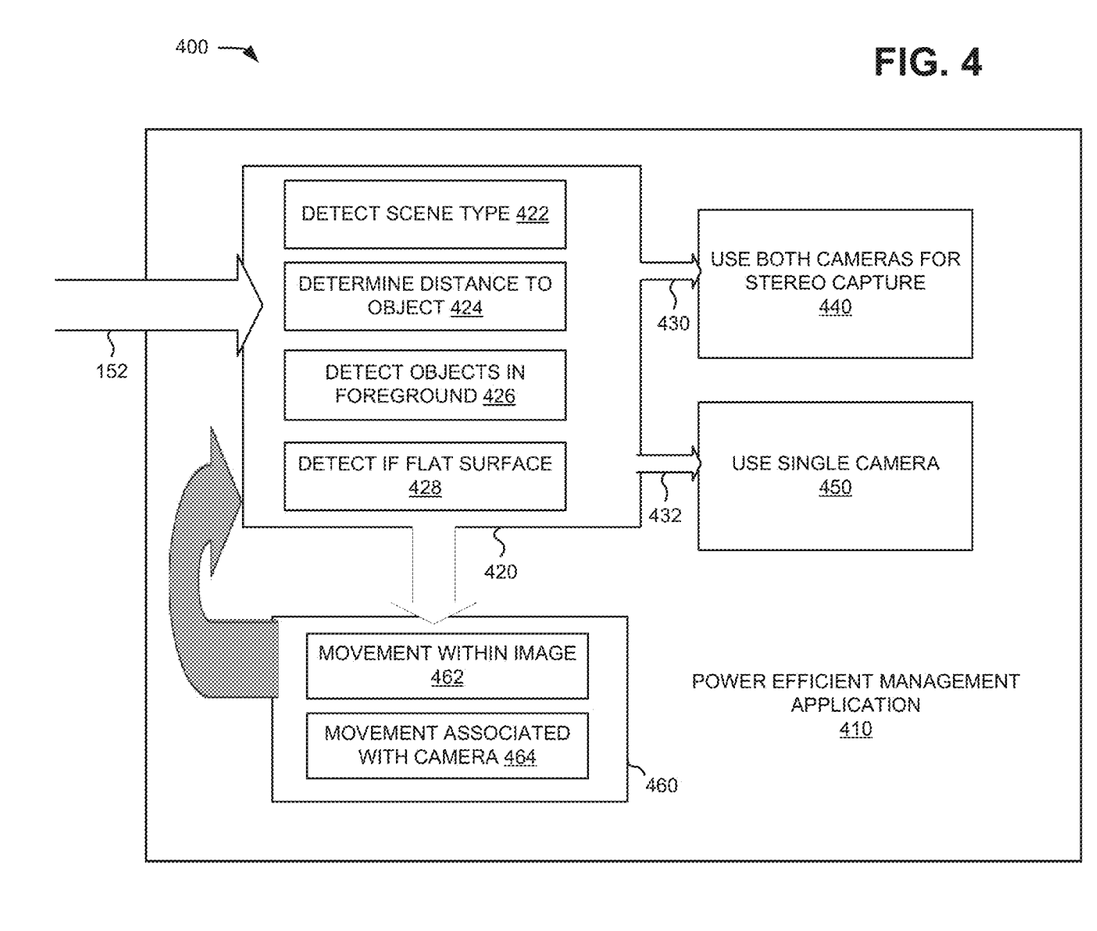
FIG. 4 is a conceptual representation of a process for efficient management of power in a stereo camera described herein.

FIG. 4 is a conceptual representation of a power efficiency consumption determination process 400 for a digital camera system 120 in user device (e.g., mobile device 102) that may be executed by a power efficient management application 410. Power efficient management application 410 may initiate process 400 when an image 152 is received from a stereo pair camera 124 (described above with respect to FIG. 1).

As shown in FIG. 4, power efficient management application 410 may initiate a parallax detection sub process 420. Each frame detected by the camera 124 or cameras 124 may be processed via ISP 220 (not shown in FIG. 4) and power efficient management application 410. Parallax detection sub process 420 may include detection of whether a particular scene requires a particular mode (and if a scene change requires a change of mode). Parallax detection sub process 420 may detect a scene type 422. Particular modes may be more conducive to capture in 2D (e.g., document mode). Parallax detection sub process 420 may detect whether the scene is landscape, portrait, a document, etc., and may exclude from stereo capture accordingly based on the selected mode. Modes that are excluded from stereo capture may be captured using a single camera (sub process 450).

Parallax detection sub process 420 may determine whether the particular scene is to be captured using as ingle camera in instances in which the parallax information is not enough even though the mode indicates a 3D image by default. For example, parallax detection sub process 420 may determine the distance to an object 424. If the distance to the object exceeds a particular threshold, parallax detection sub process 420 may determine that the scene is to be captured in landscape format using a single camera 124 (sub process 450). Parallax detection sub process 420 may also determine whether there any objects in foreground 426. If there are objects in the foreground (426 —yes), parallax detection sub process 420 may determine that the picture is to be captured using stereo capture by both cameras 124 (sub process 440). In some instances, parallax detection sub process 420 may detect whether a surface in a scene is a flat surface based on reflections or material type (e.g., using IR spectrum reflectivity). If the surface is a flat surface, parallax detection sub process 420 may indicate that a single camera is to be used (sub process 450).

Adjustment detection sub process 460 may be initiated in instances in which there are indications that the parallax between images 152 may have significantly changed. Adjustment detection sub process 460 may determine whether there is movement in the image that may have changed scene type. For example, adjustment detection sub process 460 may determine whether a car is entering the scene. Adjustment detection sub process 460 may determine whether there are likely to be changes to the images 152 that require stereo capture (e.g., if the scene constantly changing point of view). Adjustment detection sub process 460 may also detect movement of parts of the camera (e.g., housing rotating/moving). Adjustment detection sub process 460 may also detect movement of the mobile device 102 (e.g., via a gyroscope, accelerometer, etc.).

Figure 5:
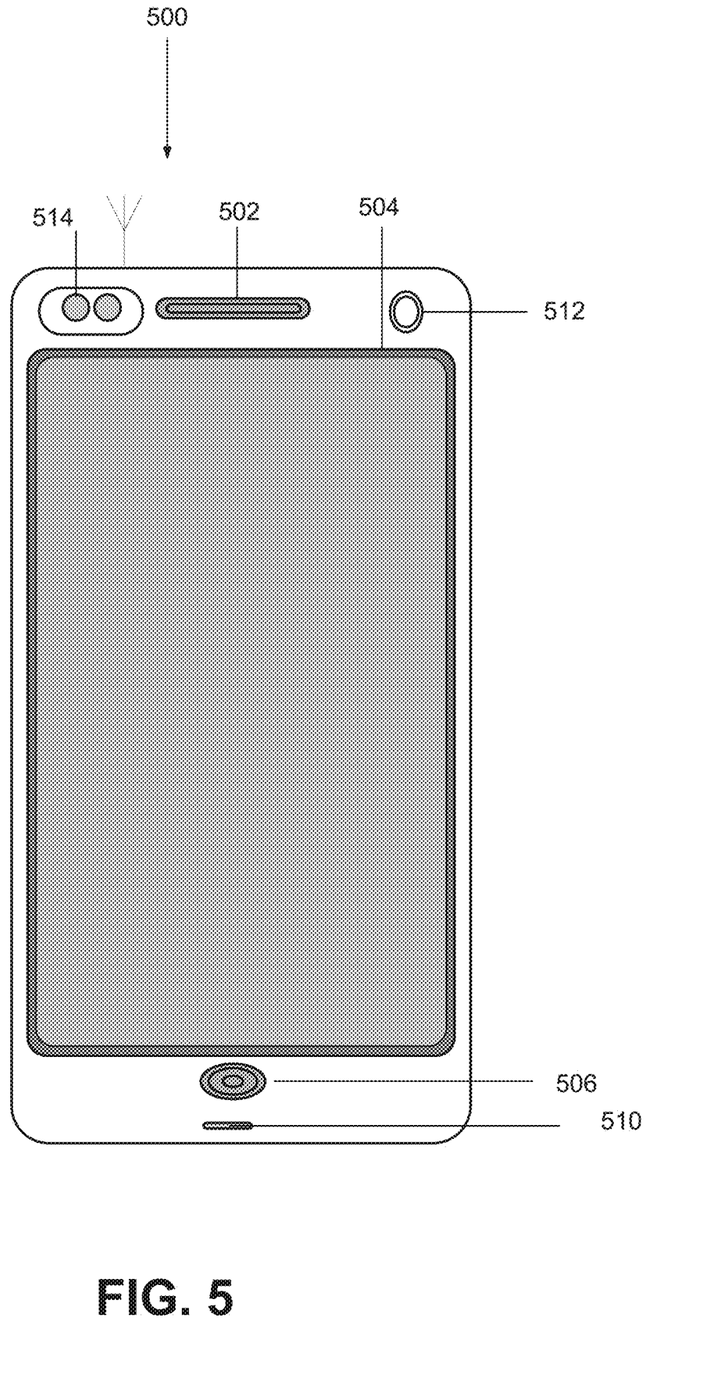
FIG. 5 is a conceptual representation of an inertial navigation system recalibration process described herein.

FIG. 5 is a diagram of an exemplary device 500 in which the concepts described herein may be implemented. Device 500 may include any of the following devices: a mobile telephone; a cellular phone; an electronic notepad, a tablet computer, a laptop, and/or a personal computer; a personal digital assistant (PDA) that can include a telephone; a gaming device or console; or another type of computational or communication device that includes a digital camera.

In this implementation, device 500 may take the form of a mobile phone (e.g., a cell phone). As shown in FIG. 5, device 500 may include a speaker 502, a touchscreen display 504, a control button 506, a microphone 510, sensors 512, a front camera 514, and a housing 516. Speaker 502 may provide audible information to a user of device 500

Display 504 may provide visual information to the user, such as an image of a caller, video images, or pictures. In addition, display 504 may include a touchscreen for providing input to device 500.

Consistent with implementations described herein, display 504 may allow digital camera system 120 to provide information to the user based on machine readable instructions indicating a level of parallax associated with a current image 152. In some implementations, display 504 may indicate a direction in which parallax may be increased if the camera is moved. The direction in which parallax approaches the predetermined threshold may be indicated by visual icons such as arrows on display 504. Display 504 may allow the user to capture images with greater parallax for 3D images by providing feedback to the user regarding positioning of the cameras 124.

Control button 506 may permit the user to interact with device 500 to cause device 500 to perform one or more operations, such as provide instructions regarding scene types in which stereo pair cameras 124 are to be utilized. For example, the user may provide input to indicate that all images in face detection mode are to be captured in 3D. Control button 506 may permit the user to select 3D capture for different modes regardless of a relative level of parallax associated with particular images 152.

Microphone 510 may receive audible information from the user. Sensors 512 may collect and provide, to device 500, information (e.g., acoustic, infrared, etc.) that is used to aid the user in capturing images or in providing other types of information (e.g., a distance between a user and device 500). Front camera 514 may include a stereo camera that may enable a user to view, capture and store images (e.g., pictures, video clips) of a subject in front of device 500. Front camera 514 may receive machine-readable instructions as described herein above with respect to digital camera system 120. Housing 516 may provide a casing for components of device 500 and may protect the components from outside elements.

Figure 6:
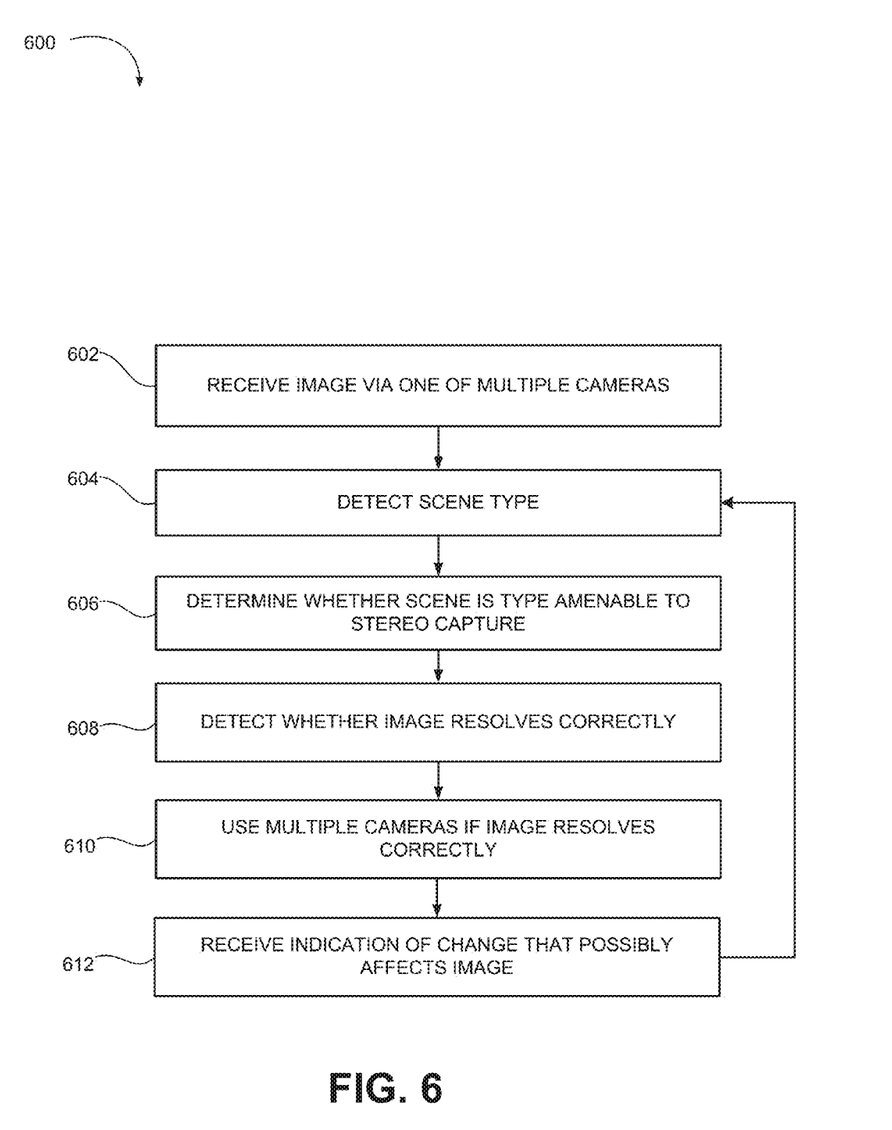
FIG. 6 is a flow diagram of an exemplary process for determining efficient management of power associated with a stereo camera in a mobile device.

FIG. 6 is a flow chart of an exemplary process for increasing efficiency of power consumption in a digital camera that includes multiple cameras described herein. Process 600 is described with respect to FIG. 6. In one implementation, process 600 may be performed by mobile device 102. In another implementation, some or all of process 600 may be performed by another device or group of devices, including or excluding mobile device 102.

Mobile device 102 may receive an image 152-1 via one of multiple cameras 124 (block 602). For example, mobile device 102 may turn on a low resolution camera 124-1 of a stereo pair cameras 124.

At block 604, mobile device 102 may detect a scene type based on the image 152-1. For example, mobile device 102 may analyze the incoming image 152 to determine a scene type associated with the image 152 based upon image displaying the aspects associated with the particular stored scene types (or data describing the scene types).

Mobile device 102 may determine whether the scene type is amenable to stereo capture (block 606). Mobile device 102 may determine whether the scene type is a scene type that includes sufficient parallax to require stereo capture. For example, mobile device 102 may include a stored electronic list of scene types that tend to include sufficient parallax to require stereo capture and scene types that tend not to require stereo capture because of a lack of 3D information (or clarity of 3D information) within the particular image 152. Mobile device 102 may determine that the image includes a 2D display screen based on IR spectrum reflexivity or parallax difference. The 2D display screen may not be amendable to stereo capture.

Mobile device 102 may detect whether the particular image 152 includes sufficient parallax to require stereo capture (block 608). Mobile device 102 may turn on the second camera and capture stereo pair images with the first camera and the second camera. Subsequently, mobile device 102 may turn off the second camera 124-2, and determine whether the scene includes parallax based on images from the first camera 124-1 and the second camera 124-2. In one example, mobile device 102 may perform centered image segment parallax difference detection to check for surfaces or subject matter that will not resolve correctly. For example, mobile device 102 may determine whether the parallax included in the image is more than a predetermined threshold for parallax.

Mobile device 102 may manage power based on whether stereo capture is required. For example, mobile device 102 may turn both on (if only one stereo pair cameras 124 is on) for a particular scene where parallax difference greater than the predetermined threshold. If the parallax is not sufficient, mobile device 102 may turn one of the stereo pair cameras 124 off (if both are on) when parallax difference is less than the predetermined threshold.

At block 610, mobile device 102 may use both stereo pair cameras if the image if the image resolves correctly. Mobile device 102 may perform stereo image capture of the first image and the second image via the stereo camera pair. Mobile device 102 may tune a camera MIPI interface with an ISP 220 and activate both stereo pair cameras 124. The stereo pair cameras 124 may include two cameras of the same resolution (e.g., two high resolution or low resolution) or one low resolution camera 124-1 and a high resolution camera 124-2. Alternatively the cameras may be part of a micro-lens array.

Mobile device 102 may receive an indication of changes that may possibly affect the image 152 (block 612). Mobile device 102 may determine whether to readjust usage of the stereo pair cameras 124 based on a change in the image 152. For example, mobile device 102 may detect that the camera is moving (or has moved) or something change in front of the camera. Mobile device 102 may determine based on accelerometer or gyroscope whether to adjust back to stereo capture. For example, mobile device 102 may determine whether the parallax associated with the image has crossed the predetermined threshold (i.e., either increased above (if below) or decreased below (if above) the threshold).

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of blocks have been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a adjusting touch input of a device based on device motion, in other implementations, other types of input may be adjusted based on motion associated with a receiving device or an input entity.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A portable electronic device, comprising:
a digital camera comprising a stereo camera pair of a first camera and a second camera;
a system control for the digital camera configured to control the digital camera to operate in a stereo image capture mode in which both cameras of the stereo camera pair capture images and a power savings mode in which one camera of the stereo camera pair captures images, a determination of the mode in which to operate the digital camera is made by executing instructions with the system control to:
capture a first image of a scene with the first camera;
determine if the first image of the scene contains one of characteristics a scene with low parallax or characteristics of a scene with high parallax;
in response to determining that the scene contains characteristics of a scene with high parallax, capture stereo pair images of the scene with the first and second cameras and determine if the scene in the stereo pair images includes parallax greater than a predetermined threshold; and
operate the digital camera in i) the power savings mode if one of a) the first image of the scene contains characteristics of a scene with low parallax, or b) the stereo pair images includes parallax less than the predetermined threshold; or ii) the stereo image capture mode if the stereo pair images includes parallax greater than the predetermined threshold.

2. The portable electronic device of claim 1, wherein the first camera is a low resolution camera and the second camera is a high resolution camera.

3. The portable electronic device of claim 2, wherein the first camera is used to capture images in the power savings mode.

4. The portable electronic device of claim 1, wherein the first camera and the second camera are of a same resolution.

5. The portable electronic device of claim 1, wherein a characteristic of a scene with low parallax is presence in the first image of a document detected based on at least one of infrared (IR) spectrum reflexivity or parallax difference.

6. The portable electronic device of claim 1, wherein a characteristic of a scene with low parallax is presence in the first image of a two dimensional (2D) display screen detected based on at least one of infrared (IR) spectrum reflexivity or parallax difference.

7. The portable electronic device of claim 1, wherein a characteristic of a scene with high parallax is presence in the first image of a face detected based on face detection.

8. The portable electronic device of claim 1, wherein a characteristic of a scene with low parallax is presence in the first image of a landscape that includes no foreground objects detected based upon scene recognition.

9. The portable electronic device of claim 1, wherein a characteristic of a scene with high parallax is presence in the first image of a landscape that includes foreground objects detected based upon a distance from the digital camera to the foreground objects.

10. The portable electronic device of claim 1, wherein determining that the scene in the stereo pair images includes parallax greater than a predetermined threshold includes detecting a surface in the stereo pair images that will not resolve correctly in a generated 3D image.

11. The portable electronic device of claim 1, wherein the determination of the mode in which to operate the digital camera is repeated if the digital camera moves or if an object enters or leaves the scene.

12. A computer-implemented method of controlling a digital camera system that includes a stereo camera pair of a first camera and a second camera to operate in a stereo image capture mode in which both cameras of the stereo camera pair capture images and a power savings mode in which one camera of the stereo camera pair captures images, the method comprising:
capturing a first image of a scene with the first camera;
determining if the first image of the scene contains one of characteristics a scene with low parallax or characteristics of a scene with high parallax;
in response to determining that the scene contains characteristics of a scene with high parallax, capturing stereo pair images of the scene with the first and second cameras and determining if the scene in the stereo pair images includes parallax greater than a predetermined threshold; and
operating the digital camera in i) the power savings mode if one of a) the first image of the scene contains characteristics of a scene with low parallax, or b) the stereo pair images includes parallax less than the predetermined threshold; or ii) the stereo image capture mode if the stereo pair images includes parallax greater than the predetermined threshold.

13. The computer-implemented method of claim 12, wherein the first camera is a low resolution camera and the second camera is a high resolution camera.

14. The computer-implemented method of claim 12, wherein a characteristic of a scene with low parallax is presence in the first image of a document detected based on at least one of infrared (IR) spectrum reflexivity or parallax difference.

15. The computer-implemented method of claim 12, wherein a characteristic of a scene with low parallax is presence in the first image of a two dimensional (2D) display screen detected based on at least one of infrared (IR) spectrum reflexivity or parallax difference.

16. The computer-implemented method of claim 12, wherein a characteristic of a scene with high parallax is presence in the first image of a face detected based on face detection.

17. The method of claim 12, wherein determining that the scene in the stereo pair images includes parallax greater than a predetermined threshold includes detecting a surface in the stereo pair images that will not resolve correctly in a generated 3D image.

18. The method of claim 12, wherein the method is repeated if the digital camera moves or if an object enters or leaves the scene.

* * * * *